Figure 1:
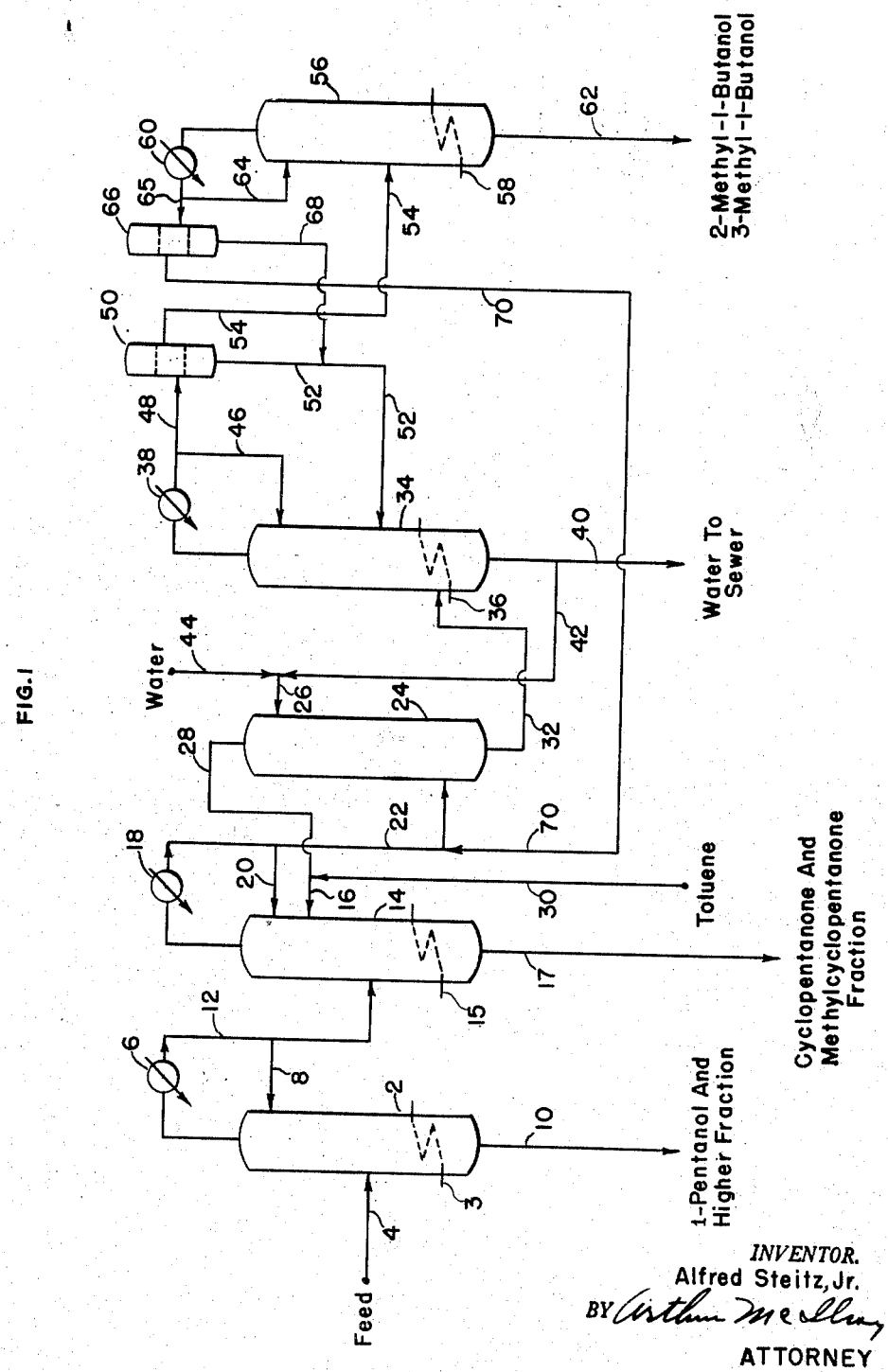

May 15, 1951

A. STEITZ, JR 2,552,911

PROCESS FOR SEPARATION OF AMYL ALCOHOLS FROM KETONES BY DISTILLATION

Filed Nov. 22, 1949

2 Sheets-Sheet 1

*INVENTOR.*
Alfred Steitz, Jr.
BY
ATTORNEY

Patented May 15, 1951

2,552,911

UNITED STATES PATENT OFFICE 2,552,911

PROCESS FOR SEPARATION OF AMYL ALCOHOLS FROM KETONES BY DISTILLATION

Alfred Steitz, Jr., Tulsa, Okla., assignor to Stanolind Oil and Gas Company, Tulsa, Okla., a corporation of Delaware Application November 22, 1949, Serial No. 128,740

14 Claims. (Cl. 202—42)

The present invention relates to a novel method for the separation of alcohols from mixtures thereof containing ketones which either azeotrope with or which boil close to the boiling point of such alcohols. More particularly, it pertains to a method for separating various of the amyl alcohols from ketones which either azeotrope therewith such as, for example, cyclopentanone and methylcyclopentanone, or which boil so close to the boiling point of said various amyl alcohols that separation by means of straight fractional distillation is impossible.

Mixtures containing 1-pentanol, 2-methyl-1-butanol, and 3-methyl-1-butanol or at least one of these alcohols together with at least one of the aforesaid ketones cannot be satisfactorily separated by means of ordinary fractional distillation methods owing to the fact that 2-methyl-1-butanol and 3-methyl-1-butanol, which boil at 128.9° C. and 132° C., respectively, form azeotropes with cyclopentanone (B. P. 130.7° C.) boiling at 124.6° and 129.4° C., respectively, while methylcyclopentanone, which boils at 138° C., cannot be separated from 1-pentanol boiling at 137.9° C. Although the problem of separating various of the above-mentioned amyl alcohols from cyclopentanone or methylcyclopentanone occurs in numerous purification procedures, one of the principal instances where an efficient method for the separation of these compounds is most urgently needed is in their recovery, along with other chemicals, from both the water and oil fractions produced by the reduction of carbon monoxide with hydrogen in the presence of a fluidized alkali-promoted iron catalyst under known synthesis conditions. The magnitude of this problem may be more fully appreciated when it is realized that in hydrocarbon synthesis plants designed for commercial operation and having a capacity of about 6,000 bbls. per day of liquid hydrocarbons, there are produced in the water stream alone approximately 4200 lbs. of amyl alcohols per day and about 1000 lbs. per day of cyclopentanone and methylcyclopentanone. Both classes of these compounds are found in the oil stream in concentrations four to five times greater than they normally occur in the aqueous fraction. Specifically, mixtures of these alcohols and ketones obtained from the water stream usually contain from about 12 to 15 per cent cyclopentanone, 8 to 10 per cent methylcyclopentanone, 40 to 50 per cent 1-pentanol, 7 to 10 per cent 2-methyl-1-butanol, and 8 to 11 per cent 3-methyl-1-butanol together with about 10 to 12 per cent of a high boiling residue, 40 to 50 per cent of which consists of various carbonyl fractions. Mixtures of this type can generally be separated initially into three fractions, i. e., (1) a portion consisting chiefly of 2-methyl-1-butanol, 3-methyl-1-butanol, and cyclopentanone, (2) a fraction of 1-pentanol and methylcyclopentanone, and (3) a fraction consisting of compounds boiling above 140° C. Further distillation of the first two fractions is ineffective to separate the components thereof owing to the fact that azeotropes are formed in each instance.

It is therefore an object of my invention to provide a method for the separation of the aforesaid amyl alcohols from ketones of the above-mentioned type. It is a further object of my invention to obtain each of the components of the aforesaid azeotropes in pure form from mixtures in which these compounds are present.

I have now discovered that 1-pentanol, 2-methyl-1-butanol, and 3-methyl-1-butanol can be readily and effectively separated from ketones with which they azeotrope by first carefully distilling a mixture of these components up to a top vapor temperature of about 134° C. whereby a separation is effected between 1-pentanol and ketones with which it azeotropes such as, for example, methylcyclopentanone on the one hand and 2-methyl-1-butanol and/or 3-methyl-1-butanol and azeotroping ketones, such as cyclopentanone, on the other. The 2-methyl-1-butanol and 3-methyl-1-butanol are found, under these conditions to distill overhead with cyclopentanone leaving a residue of 1-pentanol and methylcyclopentanone. This overhead fraction is then subjected to fractional distillation in the presence of a suitable hydrocarbon to effect separation of both the 2-methyl-1-butanol and 3-methyl-1-butanol from cyclopentanone by distilling over these alcohols in the form of their hydrocarbon azeotropes. Thereafter the resulting distillate is contacted with water or other suitable solvent to wash the alcohols away from the hydrocarbon. The mixture of wet alcohols thus obtained may then be distilled and the individual alcohols recovered in a substantially anhydrous condition either by removing the water in the form of an azeotrope with the alcohol and returning the resulting organic layer to the distillation column as reflux, or by adding ethanol, butanol, benzene, or a similar entraining agent and thereafter azeotropically distilling the mixture to remove the water leaving a dry bottoms of alcohols which can be subsequently distilled to effect a separation of the 2-methyl-1-butanol from 3-methyl-1-butanol. The original bottoms fraction, obtained by distilling the mixture of ketones and various isomeric amyl alcohols up to 134° C., contains 1-pentanol and ketones with which it azeotropes such as, for example, methylcyclopentanone. Separation of 1-pentanol from azeotroping ketone or ketones is effected by distilling a mixture thereof in the presence of a suitable hydrocarbon to obtain overhead a ketone-free azeotrope of 1-pentanol and hydrocarbon and a bottoms of alcohol-free ketone. The 1-pentanol obtained in the overhead along with hydrocarbon can be recovered in substantially pure form in accordance with the procedure generally outlined above for the purification of corresponding hydrocarbon solutions of 2-methyl-1-butanol and 3-methyl-1-butanol.

In effecting the separation of 1-pentanol, 2-methyl-1-butanol, and 3-methyl-1-butanol from ketones such as cyclopentanone and methylcyclopentanone, in the presence of a suitable hydrocarbon, the distillation step is preferably carried out in the absence of water inasmuch as in the presence of water, binary and ternary azeotropes containing water tend to be formed thus rendering the suppression of the ketones from the distillate much more difficult. Accordingly, before performing such distillation, it is generally desirable to treat the alcohol-ketone mixture with a suitable drying agent such as, for example, anhydrous sodium sulfate or anhydrous calcium sulfate. If desired, such water may be removed by means of azeotropic distillation with ethanol, benzene, or the like.

The foregoing procedure may be altered, if desired, by effecting the initial distillation step in a manner such that only the azeotrope of cyclopentanone, 2-methyl-1-butanol, and 3-methyl-1-butanol is obtained as an overhead stream and allowing the 1-pentanol fraction to remain in the bottoms. The distillate of cyclopentanone, 2-methyl-1-butanol, and 3-methyl-1-butanol may then be distilled in the presence of a suitable hydrocarbon, as previously described, while the 1-pentanol can be subsequently removed from the original crude mixture in the form of its methyl-cyclopentanone azeotrope and thereafter separated from methylcyclopentanone by subjecting said mixture to azeotropic distillation in the presence of a suitable hydrocarbon. The 1-pentanol can then be recovered from the hydrocarbon by water extraction as previously pointed out.

The azeotroping agent employed in the process of my invention should at least form an azeotrope with the 2-methyl-1-butanol and 3-methyl-1-butanol, which are present in the mixture containing cyclopentanone and methylcyclopentanone, boiling sufficiently below the boiling point of any of the ketone-alcohol azeotropes mentioned above to be separated from the latter by means of ordinary fractional distillation. Likewise the azeotroping agent preferably should not form an azeotropic mixture with the ketone or ketones from which the various amyl alcohols are to be separated. In the event that such agent does form an azeotropic mixture therewith, the boiling point thereof should be sufficiently removed from the alcohol-hydrocarbon azeotrope to permit a satisfactory separation of these azeotropes by distillation. For this purpose, hydrocarbons which boil in the range of from about 95° to 120° C. are, in general, satisfactory, particularly the $C_7$ and $C_8$ hydrocarbons boiling within the aforesaid range. Thus, for the removal of 2-methyl-1-butanol and 3-methyl-1-butanol, the $C_7$ hydrocarbons and certain of the $C_8$ hydrocarbons are suitable such as, for example, 1-heptene, n-heptane, 3-methylheptane, 3-ethylhexane, and the like; cycloaliphatic hydrocarbons such as dimethylcyclopentane, methylcyclohexane, 4-metholcyclohexane, and the like; and toluene. Hydrocarbons suitable for the separation of 1-pentanol from methylcyclopentanone are, in general, any of those boiling in the range of from about 120° to about 130° C. such as various of the $C_8$ and $C_9$ hydrocarbons, for example, n-octane, the dimethylcyclohexanes, the dimethylhexanes, 2,2,5 - trimethylhexane, 2,2,4,4 - tetramethylpentane, and the like.

For a better understanding of my invention, reference is made to the accompanying flow diagram of Fig. 1 in which a dry bottoms derived frm the separation of 1-butanol and lighter alcohols present in the hydrocarbon synthesis product water stream is introduced at an intermediate point in column 2 through line 4. In column 2, which is equipped with reboiler 3, the mixture is subjected to distillation up to about 134° C. and an azeotrope of cyclopentanone, 2-methyl-1-butanol, and 3-methyl-1-butanol is withdrawn overhead through condenser 6 and a portion thereof returned to the column through line 8 as reflux. The bottoms in column 2, containing 1-pentanol and higher boiling compounds, is withdrawn through line 10 and processed in accordance with the detailed procedure described in the example given below. The distillate from column 2 contains about 42 per cent cyclopentanone, 7 per cent methylcyclopentanone, 23 per cent 2-methyl-1-butanol, and 28 per cent 3-methyl-1-butanol. This distillate is introduced through line 12 into column 14 equipped with reboiler 15 and fractionally distilled in the presence of a suitable entraining agent such as toluene which is introduced into column 14 through line 16 and an azeotrope of 2-methyl-1-butanol, 3-methyl-1-butanol, and toluene is withdrawn overhead through condenser 18. The bottoms in column 14 consists chiefly of methylcyclopentanone and cyclopentanone and is withdrawn therefrom through line 17. The keytones may be recovered from this fraction in substantially pure form by straight fractional distillation. A portion of the overhead stream from column 14 is returned thereto as reflux through line 20 and the remainder withdrawn through line 22 and introduced into extraction column 24. Within the column the mixture of toluene, 2-methyl-1-butanol, 3-methyl-1-butanol flows upwardly countercurrent to a descending water stream introduced into the top of the column through line 26. The water extracts substantially all of the alcohols present in the toluene. The resulting washed toluene flows out of the top of column 24 through line 28 and is recycled through line 16 to column 14. Ordinarily, the water content of the toluene at this stage is not sufficient to produce objectionable ternary azeotropes with the ketones in column 14. However, in the event the toluene recycled from extraction column 24 becomes too wet, it should be subjected to a drying operation prior to its return to column 14 so that the formation of such azeotropes simultaneously with the desired toluene azeotropes of 2-methyl-1-butanol and 3-methyl-1-butanol will be avoided. Make-up toluene is added to the system through line 30 as needed. An aqueous mixture of the aforesaid amyl alcohols containing some toluene flows out the bottom of extraction column 24 through line 32 and is introduced into an intermediate section of stripper column 34 equipped with reboiler 36. The alcohols and toluene are stripped out of the aqueous stream and a mixture containing predominantly 2-methyl-1-butanol and 3-methyl-1-butanol, together with a minor amount of toluene and water, is taken off overhead through condenser 38. A lean aqueous stream flows out the bottom of stripper column 34 through line 40 and is recycled in part to the top of column 24 through lines 42 and 26. Excess water is withdrawn through line 40 and make-up water is added to line 26 through line 44 as needed. The overhead withdrawn from column 34 through condenser 38 is partially recycled as reflux to the column through line 46 and the remainder is withdrawn through line 48 to separator 50 where the condensate stratifies into two layers. The lower aqueous layer containing a small amount of toluene and alcohols is withdrawn from the separator through line 52 and returned to stripper column 34 preferably at an intermediate section thereof. The organic layer consisting essentially of 2-methyl-1-butanol and 3-methyl-1-butanol, together with a relatively small quantity of dissolved water and toluene, is transferred through line 54 to drying column 56. Within this column substantially all of the water and toluene, together with a relatively small quantity of 2-methyl-1-butanol and 3-methyl-1-butanol, are distilled overhead by the action of reboiler 58 through condenser 60 while a substantially anhydrous bottoms of purified 2-methyl-1-butanol and 3-methyl-1-butanol is withdrawn from column 56 through line 62. The mixture of amyl alcohols thus obtained may thereafter be separated from one another by means of fractional distillation. The liquid from condenser 60 is returned in part to column 56 through line 64 and the remainder is withdrawn through line 65 introduced into separator 66. The aqueous layer from separator 66, containing a small quantity of toluene, 2-methyl-1-butanol, and 3-methyl-1-butanol, is withdrawn through line 68 and preferably returned to column 34 via line 52. The organic phase consisting principally of toluene, together with a small quantity of 2-methyl-1-butanol and 3-methyl-1-butanol, is preferably recycled to extraction column 24 via lines 70 and 22.

Figure 2:
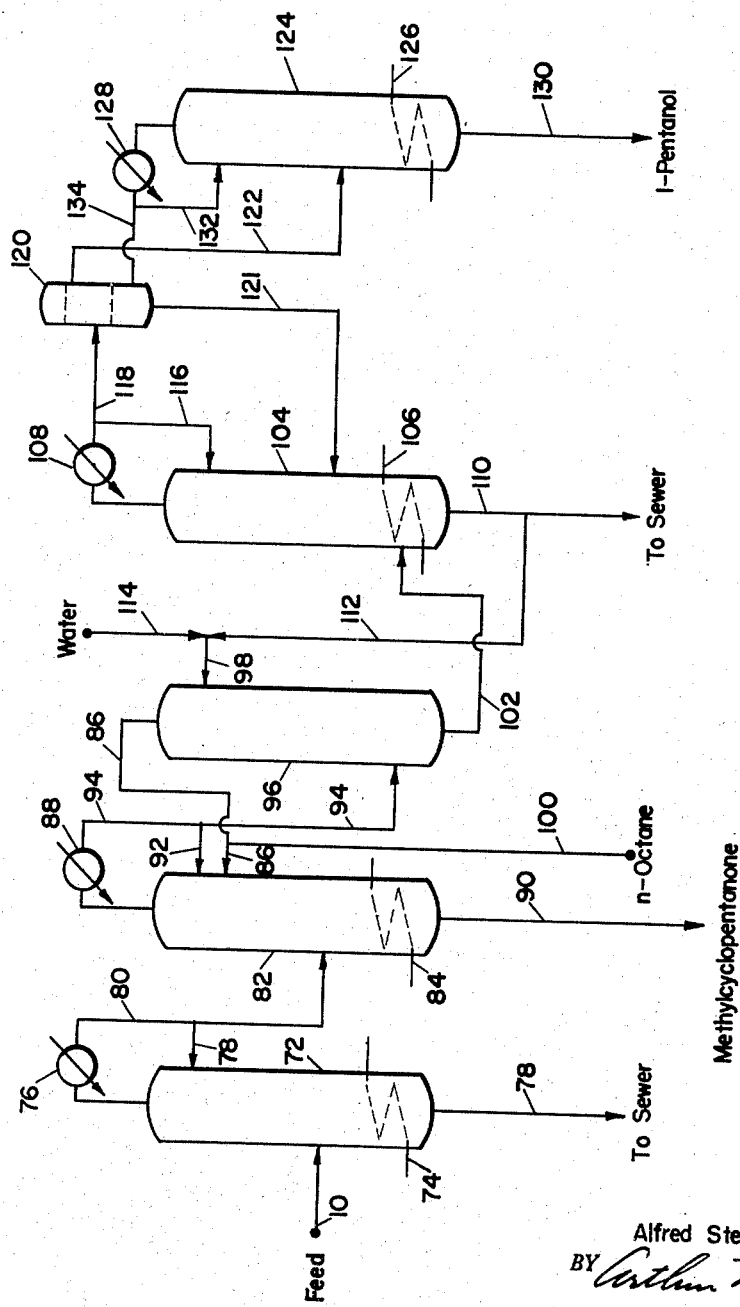

Fig. 2 is a flow diagram for the recovery and purification of 1-pentanol from methylcyclopentanone and higher boiling impurities in which the feed employed is derived from the bottoms fraction produced in column 2 of the flow diagram shown in Fig. 1. The feed is introduced through line 10 into an intermediate point in column 72, equipped with reboiler 74, and the mixture is subjected to distillation up to a temperature of about 140° C. yielding an azeotrope of 1-pentanol and methylcyclopentanone which is withdrawn overhead through condenser 76 and a portion thereof returned to the column through line 78 as reflux. The bottoms in column 72, containing higher boiling impurities, is withdrawn through line 78 and discarded. The distillate from column 72 contains about 15 per cent methylcyclopentanone and 85 per cent 1-pentanol. This distillate is introduced through line 80 into column 82, equipped with reboiler 84, and fractionally distilled in the presence of a suitable entraining agent, such as n-octane, which is introduced into column 82 through line 86 and an azeotrope of 1-pentanol and n-octane boiling at about 116° C. is withdrawn overhead through condenser 88. The bottoms in column 82 consisting chiefly of methylcyclopentanone is withdrawn therefrom through line 90. Methylcyclopentanone can be recovered from this fraction in substantially pure form by ordinary fractional distillation. A portion of the overhead stream from column 82 is returned thereto as reflux through line 92 and the remainder withdrawn through line 94 and introduced into extraction column 96. Within the column the mixture of n-octane and 1-pentanol flow upwardly countercurrently to a descending water stream introduced at the top of the column through line 98. The water extracts substantially all of the 1-pentanol present in the n-octane. The resulting washed n-octane flows out of the top of column 96 through line 86 and is recycled to column 82. Ordinarily, the water content of the n-octane at this stage is not sufficient to produce objectionable ternary azeotropes with the methylcyclopentanone in column 82. However, in the event the n-octane recycled from extraction column 96 becomes too wet, it should be subjected to a drying operation prior to its return to column 82 so that the formation of such azeotropes simultaneously with the desired azeotrope of n-octane and 1-pentanol will be avoided. Make-up n-octane is periodically introduced through line 100 into an intermediate section of column 82. An aqueous extract of 1-pentanol together with a small amount of n-octane is taken from column 96 by means of line 102 and introduced into column 104 provided with reboiler 106. 1-pentanol and n-octane are stripped out of the aqueous stream and a distillate containing predominantly 1-pentanol together with a minor amount of n-octane and water is taken off overhead through condenser 108. A lean aqueous stream flows out of the bottom of stripping column 104 through line 110 and is recycled in part to the top of column 96 through lines 112 and 98. Excess water is eliminated from the system through line 110 and make-up water, if needed, is added to column 96 through line 114. The overhead withdrawn from column 104 through condenser 108 is partially recycled to the column through line 116, and the remainder is withdrawn through line 118 and introduced into separator 120 where the condensate stratifies into two layers. The lower aqueous layer containing a small amount of n-octane and 1-pentanol is withdrawn from the separator through line 121 and returned to stripper column 104, preferably at an intermediate section thereof. The organic layer consisting essentially of 1-pentanol together with a relatively small quantity of dissolved water and n-octane is transferred through line 122 to drying column 124. Within this column substantially all of the water and n-octane together with a relatively small quantity of 1-pentanol are distilled overhead, by the use of heat supplied by reboiler 126, through condenser 128 while a substantially anhydrous bottoms of purified 1-pentanol is withdrawn from the column through line 130. The liquid from condenser 128 is returned in part to column 124 through line 132, and the remainder is withdrawn through line 134 and introduced into separator 120 where it is combined with distillate from column 104.

The process of my invention may be further illustrated by the following specific example.

*Example*

A crude mixture amounting to 2440 parts (all parts are by volume) and consisting of 7.5 per cent 2-methyl-1-butanol, 9.2 per cent 3-methyl-1-butanol, 48.5 per cent 1-pentanol, 14 per cent cyclopentanone, 8.8 per cent methylcyclopentanone, and 12 per cent of a residue boiling above 140° C. was introduced into a batch still and a distillate collected up to 134° C. The fraction thus obtained amounted to 910 parts and consisted of 15.7 per cent cyclopentanone, 2.6 per cent methylcyclopentanone, 8.6 per cent 2-methyl-1-butanol, and 10.4 per cent 3-methyl-1-butanol. To this distillate was next added 3500 parts of toluene and the resulting mixture distilled to give a fraction consisting of a mixture of toluene-2-methyl-1-butanol and toluene-3-methyl-1-butanol azeotropes, the alcohols being present in the combined mixtures in a concentration of 11.6 per cent. The toluene-2-methyl-1-butanol azeotrope boiled at 108° C. while the toluene-3-methyl-1-butanol azeotrope distilled over at 109° C. The resulting mixture of azeotropes, which amounted to 4000 parts, was thereafter extracted twelve times with equal volumes of water. Extraction of the distillate in this manner resulted in the recovery of 84.7 per cent of the amyl alcohols from the toluene. Water was thereafter removed from the combined extracts by distilling the latter in the presence of ethanol after which the residue, consisting essentially of the two alcohols and amounting to 393 parts, was subjected to careful fractionation and the 2-methyl-1-butanol and 3-methyl-1-butanol separately recovered. Both 2-methyl-1-butanol and 3-methyl-1-butanol were carbonyl free and were found on analysis to have a purity in excess of 99 per cent. The bottoms portion obtained in the separation of the amyl alcohols, as their toluene azeotropes, amounted to 446 parts and on further fractionation gave 390 parts of cyclopentanone and 50 parts of methylcyclopentanone, both fractions being substantially free of amyl alcohols.

The residue obtained as the result of initially distilling the original crude mixture up to 134° C. was subjected to further distillation and the fraction boiling from 135° to 138.4° C. was collected. This cut amounted to 1530 parts and contained all of the 1-pentanol originally present in the crude mixture together with the major portion of methylcyclopentanone. To this fraction was next added 5000 parts of n-octane and the resulting mixture distilled up to about 125.6° C. to ensure complete removal of the 1-pentanol from the methylcyclopentanone, although the n-octane-1-pentanol azeotrope boils at only 121.8° C. The distillate thus obtained, which amounted to 6340 parts, was next extracted with water and the resulting combined extractions dried in the manner described above. The dry fraction obtained in this manner was further distilled to obtain 1075 parts of 1-pentanol free from carbonyl contaminants and having a purity of 99 per cent.

While the foregoing example and flow diagram illustrate advantageous embodiments of my invention, it is to be understood that the scope thereof is not limited thereto. On the contrary, my invention is to be construed broadly with respect to the present description and claims and, in general, it is to be understood that any modifications or equivalents that would normally occur to those skilled in the art are to be considered as lying within the scope of my invention. Thus, it will be apparent that mixtures of the various hydrocarbons found to be suitable in carrying out the process of my invention may be, in certain instances, advantageously employed. Likewise, it may be desirable to employ classes of entraining agents other than those mentioned herein but which boil within the aforesaid ranges.

Unless otherwise indicated, the expression "close boiling ketones" as used herein is intended to include both ketones which azeotrope with the alcohol or alcohols concerned or which actually boil so close thereto that separation of the alcohol or alcohols therefrom cannot be effected by ordinary distillation techniques.

I claim:

1. In a process for the recovery of 1-pentanol, 2-methyl-1-butanol, and 3-methyl-1-butanol from mixtures containing ketones, at least some of which azeotrope with 1-pentanol and some of which azeotrope with 2-methyl-1-butanol and 3-methyl-1-butanol, the steps which comprise subjecting said mixture to distillation to obtain an overhead stream of 2-methyl-1-butanol, 3-methyl-1-butanol, and azeotroping ketone but substantially free of 1-pentanol, and a bottoms containing 1-pentanol and a close boiling ketone, adding a hydrocarbon boiling within the range of from about 95° to about 120° C. to said overhead stream and subjecting the resulting mixture to distillation to produce an overhead fraction of 2-methyl-1-butanol, 3-methyl-1-butanol, and hydrocarbon azeotropes free of ketone, adding a hydrocarbon boiling in the range from about 120° to about 130° C. to said bottoms, and thereafter distilling the resulting mixture to recover a ketone-free overhead comprising 1-pentanol.

2. In a process for the recovery of 1-pentanol, 2-methyl-1-butanol, and 3-methyl-1-butanol from mixtures containing ketones, at least some of which azeotrope with 1-pentanol and some of which azeotrope with 2-methyl-1-butanol and 3-methyl-1-butanol, the steps which comprise subjecting said mixture to distillation to obtain an overhead stream of 2-methyl-1-butanol, 3-methyl-1-butanol, and azeotroping ketone but substantially free of 1-pentanol, and a bottoms containing 1-pentanol and a close boiling ketone, adding toluene to said overhead stream and subjecting the resulting mixture to distillation to produce an overhead fraction of 2-methyl-1-butanol, 3-methyl-1-butanol, and toluene free of ketone, adding n-octane to said bottoms, and thereafter distilling the resulting mixture to recover a ketone-free overhead comprising 1-pentanol.

3. In a process for the recovery of 1-pentanol, 2-methyl-1-butanol, and 3-methyl-1-butanol from mixtures containing cyclopentanone and methylcyclopentanone, the steps which comprise subjecting said mixture to distillation to obtain an overhead stream consisting essentially of cyclopentanone, 2-methyl-1-butanol, and 3-methyl-1-butanol but substantially free of 1-pentanol and a bottoms containing 1-pentanol and methylcyclopentanone, adding a hydrocarbon selected from the group consisting of $C_7$ and $C_8$ hydrocarbons boiling within the range of from about 95° to about 120° C. to said stream and subjecting the resulting mixture to distillation to produce an overhead fraction of 2-methyl-1-butanol, 3-methyl-1-butanol, and hydrocarbon azeotropes free of cyclopentanone, adding a hydrocarbon selected from the group consisting of $C_8$ and $C_9$ hydrocarbons boiling in the range of from about 120° to about 130° C. to said bottoms, and thereafter distilling the resulting mixture to recover a ketone-free overhead comprising 1-pentanol.

4. In a process for the recovery of 1-pentanol from mixtures containing at least one close boiling ketone, the steps which comprise adding to said mixture a hydrocarbon selected from the group consisting of $C_8$ and $C_9$ hydrocarbons boiling in the range of from about 120° to about 130° C., subjecting the resulting mixture to distillation, recovering overhead an azeotrope of 1-pentanol and a hydrocarbon free of ketone, and leaving a bottoms comprising ketone substantially free from 1-pentanol.

5. In a process for the recovery of 1-pentanol from mixtures containing at least one close boiling ketone, the steps which comprise adding to said mixture n-octane, subjecting the resulting mixture to distillation, recovering overhead an azeotrope of 1-pentanol and n-octane free of ketone, and leaving a bottoms comprising ketone substantially free from 1-pentanol.

6. In a process for the recovery of 1-pentanol from mixtures containing methylcyclopentanone, the steps which comprise adding to said mixture n-octane, subjecting the resulting mixture to distillation, recovering overhead an azeotrope of 1-pentanol and n-octane free of methylcyclopentanone and leaving a bottoms comprising methylcyclopentanone substantially free from 1-pentanol.

7. In a process for the recovery of 2-methyl-1-butanol and 3-methyl-1-butanol from mixtures containing close boiling ketones, the steps which comprise subjecting said mixture to distillation in the presence of a $C_7$ hydrocarbon and withdrawing overhead a fraction of 2-methyl-1-butanol and 3-methyl-1-butanol substantially free from said ketones.

8. In a process for the recovery of 3-methyl-1-butanol from mixtures containing ketones which azeotrope with the aforesaid alcohol, the steps which comprise subjecting said mixture to distillation in the presence of a $C_7$ hydrocarbon and withdrawing overhead a fraction of 3-methyl-1-butanol substantially free from said ketones.

9. In a process for the recovery of 2-methyl-1-butanol from mixtures containing ketones which azeotrope with the aforesaid alcohol, the steps which comprise subjecting said mixture to distillation in the presence of a $C_7$ hydrocarbon and withdrawing overhead a fraction of 2-methyl-1-butanol substantially free from said ketones.

10. In a process for the recovery of 3-methyl-1-butanol from mixtures containing ketones which azeotrope with the aforesaid alcohol, the steps which comprise subjecting said mixture to distillation in the presence of toluene and withdrawing overhead a fraction of 3-methyl-1-butanol substantially free from said ketones.

11. In a process for the recovery of 2-methyl-1-butanol from mixtures containing ketones which azeotrope with the aforesaid alcohol, the steps which comprise subjecting said mixture to distillation in the presence of toluene and withdrawing overhead a fraction of 2-methyl-1-butanol substantially free from said ketones.

12. In a process for the recovery of 2-methyl-1-butanol from mixtures containing cyclopentanone, the steps which comprise subjecting said mixture to distillation in the presence of toluene and withdrawing overhead a fraction of 2-methyl-1-butanol substantially free from cyclopentanone.

13. In a process for the recovery of 3-methyl-1-butanol from mixtures containing methylcyclopentanone, the steps which comprise subjecting said mixture to distillation in the presence of toluene and withdrawing overhead a fraction of 3-methyl-1-butanol substantially free from methylcyclopentanone.

14. In a process for the recovery of 1-pentanol, 2-methyl-1-butanol, and 3-methyl-1-butanol from mixtures containing cyclopentanone and methylcyclopentanone, the steps which comprise subjecting said mixture to distillation to obtain an overhead stream consisting essentially of cyclopentanone, 2-methyl-1-butanol, and 3-methyl-1-butanol but substantially free of 1-pentanol and a bottoms containing 1-pentanol and methylcyclopentanone, adding a hydrocarbon selected from the group consisting of $C_7$ and $C_8$ hydrocarbons boiling within the range of from about 95° to about 120° C. to said stream and subjecting the resulting mixture to distillation under substantially anhydrous conditions to produce an overhead fraction of 2-methyl-1-butanol, 3-methyl-1-butanol, and hydrocarbon azeotropes free of cyclopentanone, adding a hydrocarbon selected from the group consisting of $C_8$ and $C_9$ hydrocarbons boiling in the range of from about 120° to about 130° C. to said bottoms, and thereafter distilling the resulting mixture under substantially anhydrous conditions to recover a ketone-free overhead comprising 1-pentanol.

ALFRED STEITZ, Jr.

REFERENCES CITED

The following references are of record in the file of this patent:

UNITED STATES PATENTS

| Number | Name | Date |
|---|---|---|
| 2,053,769 | Dreyfus | Sept. 8, 1936 |
| 2,324,255 | Britton | July 13, 1943 |
| 2,351,527 | Lemboke | June 13, 1944 |
| 2,381,032 | Bloodworth et al. | Aug. 7, 1945 |
| 2,500,329 | Steitz, Jr. | Mar. 14, 1950 |